United States Patent
Wee et al.

(10) Patent No.: US 9,671,267 B2
(45) Date of Patent: Jun. 6, 2017

(54) METHOD AND APPARATUS FOR ACCURATELY MEASURING INDIVIDUAL COMPONENTS OF A MULTIPHASE FLUID USING SEPARATELY MEASURED REYNOLDS NUMBER AND EMULSION TYPE OF LIQUID PHASE

(71) Applicant: FMC Kongsberg Subsea AS, Kongsberg (NO)

(72) Inventors: Arnstein Wee, Randaberg (NO); Kenneth Gundersen, Bryne (NO)

(73) Assignee: FMC KONGSBERG SUBSEA AS, Kongsberg (NO)

( * ) Notice: Subject to any disclaimer, the term of this patent is extended or adjusted under 35 U.S.C. 154(b) by 0 days.

(21) Appl. No.: 15/026,207

(22) PCT Filed: Oct. 1, 2014

(86) PCT No.: PCT/NO2014/050184
§ 371 (c)(1),
(2) Date: Mar. 30, 2016

(87) PCT Pub. No.: WO2015/050460
PCT Pub. Date: Apr. 9, 2015

(65) Prior Publication Data
US 2016/0238422 A1    Aug. 18, 2016

(30) Foreign Application Priority Data

Oct. 1, 2013 (NO) .................................. 20131320

(51) Int. Cl.
*G01F 1/50* (2006.01)
*G01F 1/74* (2006.01)
(Continued)

(52) U.S. Cl.
CPC .................. *G01F 1/74* (2013.01); *G01F 1/44* (2013.01); *G01F 1/50* (2013.01); *G01F 1/58* (2013.01)

(58) Field of Classification Search
None
See application file for complete search history.

(56) References Cited

U.S. PATENT DOCUMENTS 3,789,663 A * 2/1974 Gold .......................... G01P 5/18
702/47
5,483,840 A * 1/1996 Chang ....................... G01F 1/06
73/861.71
(Continued)

FOREIGN PATENT DOCUMENTS

EP      2192391 A1    6/2010
GB      2430493 A     3/2007
(Continued)

OTHER PUBLICATIONS

Nowegian Search Report in NO 20131320, filed on Oct. 1, 2013, mailed on May 16, 2014.
(Continued)

*Primary Examiner* — Harshad R Patel
(74) *Attorney, Agent, or Firm* — Oppedahl Patent Law Firm LLC (57) ABSTRACT

A method for determining the flow rates of a multi-component mixture in a pipe including a gas phase and a liquid phase comprising an emulsion of oil and water, the emulsion being either of the water continuous type or the oil continuous type, the method comprising the following steps: a. the flow rates of the individual components of the multi-component mixture are measured, b. the Reynolds number of the multi-component mixture is measured, c. the emulsion type of the liquid phase of the multi-component mixture is determined, and d. based on the results from steps b and c, (Continued)

a more accurate flow-rate of the individual components of the multi-component mixture and a fluid property of at least one of the components of the multi-component mixture are calculated. An apparatus for performing the method is also disclosed.

17 Claims, 7 Drawing Sheets

(51) Int. Cl.
  *G01F 1/44* (2006.01)
  *G01F 1/58* (2006.01)

(56) References Cited

U.S. PATENT DOCUMENTS

| | | |
|---|---|---|
| 6,182,504 B1 | 2/2001 | Gaisford |
| 7,133,786 B1 | 11/2006 | Dykesteen et al. |
| 2009/0308601 A1 | 12/2009 | Poe, Jr. et al. |
| 2010/0138168 A1 | 6/2010 | Pinguet |
| 2010/0164514 A1 | 7/2010 | Brandt |
| 2012/0216625 A1 | 8/2012 | Bruno |

FOREIGN PATENT DOCUMENTS

| | | |
|---|---|---|
| WO | 99/36747 A1 | 7/1999 |
| WO | 2010/133348 A2 | 11/2010 |

OTHER PUBLICATIONS

International Search Report in PCT/NO2014/050184, Filed on Jan. 10, 2014, mailed on Jan. 15, 2015.
International Preliminary Report on Patentability in PCT/NO2014/050184, Filed Jan. 10, 2014, mailed on Sep. 11, 2015.
Taylor J B et al: "Characterization of the effect of surface roughness and texture on fluid flow-past, present, and future", International Journal of Thermal Sciences, vol. 45, No. 10, Feb. 13, 2006 (Feb. 13, 2006), pp. 962-968.
Supplementary European Search Report in EP 14 85 0355, Sep. 7, 2016.
Supplementary European Search Report in EP 14 85 0813, Sep. 7, 2016.

* cited by examiner

METHOD AND APPARATUS FOR ACCURATELY MEASURING INDIVIDUAL COMPONENTS OF A MULTIPHASE FLUID USING SEPARATELY MEASURED REYNOLDS NUMBER AND EMULSION TYPE OF LIQUID PHASE

The present invention relates to a method and flow meter for determining the flow rates of individual components of a multiphase fluid.

A flowing mixture of oil, water and gas is a common occurrence in the oil industry being a product of an unprocessed well stream. Such a well stream is often referred to as a multiphase mixture where oil, water and gas are referred to as individual phases or fractions. When the amount of gas (GVF) is greater than 90% of the total volume in the pipe, the well is often referred to as a wetgas well. For clarification purposes, multiphase flow in the context of this patent application covers the full component fraction range and hence includes both wetgas and multiphase flow conditions.

The oil wells can also be classified as light or heavy oil. A condensate is a very light oil where the density typically is less than 700 kg/m3 and the viscosity typically is less than 1 cP. A light crude oil typical has a density in the range 700-900 kg/m3 and a viscosity in the range 1-100 cP. A heavy oil is more viscous and has a higher density. Typical viscosity range is 100-10.000 cP and density in the range 850-1200 kg/m3. Water typically has a density in the range 1000-1200 kg/m3 with a viscosity in the range 0.5-2 cP.

In order to optimize the production and life of an oil/gas field, operators need to be able to regularly monitor the output of each well in the field. The conventional way of doing this is to use a test separator. Test separators are expensive, occupy valuable space on a production platform, and require a long time to monitor each well because of the stabilized flow conditions required. In addition, test separators are only moderately accurate (typically ±5 to 10% of each phase flow rate) and cannot be used for continuous well monitoring. Most separators use the density difference between oil, water and gas to separate the three phases, either by using the earth gravity in a tank or by using a cyclone principle.

These techniques are well known. However, if the density of the oil and water is of similar magnitude and the viscosity of the oil is high, gravity or cyclone based separators are not able to provide proper separation of the oil and water phase, which may lead to large measurement errors for the test separator.

A three-phase flow meter could be used in the first instance instead of a test separator and in the long term as a permanent installation on each well. There are several techniques and known instruments for measuring multiphase flow, as will be further described below. Such instruments need to be reasonably accurate (typically better than ±5% of rate for each phase), non-intrusive, reliable, flow regime independent and provide accurate measurements over the full component fraction range. Such an arrangement would save the loss in production normally associated with well testing. Such loss is estimated to be approximately 2% for a typical offshore installation. Allocation metering is needed when a common pipeline is used to transport the output from a number of wells owned by different companies to a processing facility. This is currently achieved by passing the output of each well through a test separator before entering the common pipeline. However, in addition to the disadvantages of the test separator described above, dedicated test pipelines to each well are also required. A permanently installed three-phase flow meter would offer significant advantages for allocation metering.

Other devises for measurement of flow rates of a multiphase mixture may be based on measurement of differential pressures across a restriction in the pipe such as a Venturi tube, Orifice plate, v-Cone, Dall tube, flow mixer or Wedge tube. Examples of such devices can be found in U.S. Pat. Nos. 4,638,672, 4,974,452, 6,332,111, 6,335,959, 6,378,380, 6,755,086, 6,898,986, 6,993,979, 5,135,684, WO 00/45133 and WO03/034051.

In fact, any restriction in the pipe will result in a change in the velocity of the multiphase mixture and introduce a pressure drop across the restriction. Based on the theory of fluid dynamics, the square root of the pressure drop is proportional to the total mass flow rate in the pipe. A venturi tube, dall tube, orifice plate and v-cone are examples of a structure where the pipe diameter is gradually reduced into a section of the pipe with a smaller diameter. The smaller section may be short or a relative long section. For a venturi, the diameter is gradually expanded to the original size of the pipe whereas the dall tube and orifice plate has a more abrubt transition after the narrow section. Mass flow measurements with such structures are well known and described in standards, patents and other publications. One such standard is the ISO standard 5167 "Measurement of fluid flow by means of pressure differential devices inserted in circular cross-section conduits running full" part 1—general principles and part 4—venturi tubes.

According to ISO 5167-1, the mass flow rate can be calculated as:

$$Qm = \frac{C}{\sqrt{1-\beta^4}} \frac{\pi}{4} d^2 \sqrt{2\rho\Delta p} \qquad \text{Equation 1}$$

where:
Qm=Total mass flow rate
C=Discharge coefficient
$\beta$=Diameter ratio between venturi throat and pipe
d=Diameter of venturi throat
$\Delta p$=Measured pressure drop between inlet and venturi throat
$\rho$=Density of the multiphase mixture The adoption of venturi tubes for multiphase and wetgas flow conditions are further described in "*Design of a flow metering process for two-phase dispersed flows*", Int. J. Multiphase Flow vol 22, No 4, pp 713-732, "*A study of the performance of Venturi meters in multiphase flow*", by Hall, Reader-Harris, and Millington, 2$^{nd}$ North American Conference on Multiphase Technology and "*Liquid Correction of Venturi Meter Readings in Wet Gas Flow*", by Rick de Leeuw, North Sea Flow Measurement Workshop—1997.

The discharge coefficient C is a calibration constant for the venturi, which can be found either by calibrating the venturi on a fluid such as water, oil or gas or calculated based on the mechanical dimensions and properties of the venturi. These techniques are well known and not described any further.

It is also well known that the discharge coefficient for all devices based on measurement of differential pressure across a restriction in the pipe is a function of the Reynolds number of the multiphase fluid (e.g. *SPE 63118—Qualification of a Nonintrusive Multiphase Flow Meter in Viscous Flow* by D. I Atkinson et al (2000)—FIG. 5). In fluid mechanics, the Reynolds number (Re) is a dimensionless number that gives a measure of the ratio of inertial forces to viscous forces and consequently quantifies the relative importance of these two types of forces for given flow conditions. For a flow in pipes, the Reynolds number (Re) is defined as:

$$Re = \frac{VD\rho}{\mu} \qquad \text{Equation 0}$$

where V is the velocity of the fluid in the pipe, D is the pipe diameter, $\rho$ is the density of the fluid in the pipe and $\mu$ is the viscosity of the fluid in the pipe.

In the following section, the venturi is used as an example. However, the same principles apply also for other differential based flow devices such as a V-cone, Dall Tube and Orifice Plate.

When the Reynolds number is high, which is typical for most multiphase applications with gas, water and condensate/light oil, the discharge coefficient is typical in the range 0.98-1.0. For these applications, a fixed discharge coefficient in the range 0.98-1.0 can easily be used for the venturi without introducing any significant errors in the calculation of the flow rates.

However, for multiphase applications where the oil viscosity is significantly higher than water (e.g. >10 cP), the Reynolds number could be reduced such that the venturi operates in an area where the discharge coefficient is significantly lower than 1.0 and also varies with the Reynolds number.

Figure 10:
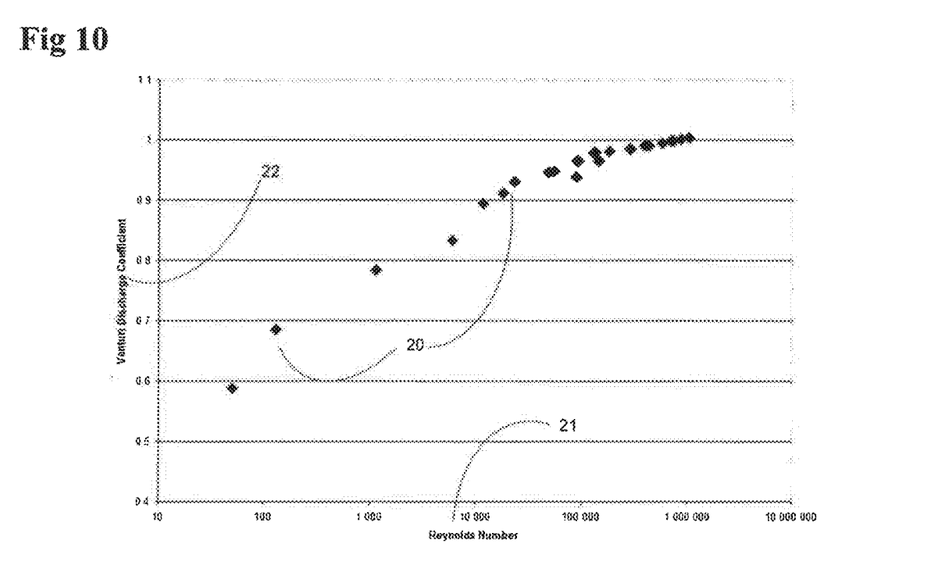
FIG. 10 shows a graph of the discharge coefficient of a venturi vs. the Reynolds number.

FIG. 10 shows examples of how the venturi discharge coefficient (20/22) changes as a function of the Reynolds number (21). From FIG. 10 it is seen that the discharge coefficient for this particularly venturi changes from 0.6 to 1.0 when the Reynolds number changes from 70 to 1.000.000. For heavy oil applications the Reynolds number may be below 10 giving a venturi discharge coefficient in the range 0.2-0.3.

Hence, any multiphase meter which uses a differential pressure based device to determine the flow rate of the multiphase fluid mixture, needs to determine the Reynolds number of the multiphase fluid in order to provide reliable measurement of the flow rate. This is particularly important for heavy oil applications since the variation in the Reynolds number then is significant.

There are many devices and methods for three-phase flow measurements. There are many ways that these flow devices can be categorized and one way is to divide them into three categories depending on which type of liquid emulsions the meter can handle. The first category is methods/devices that covers oil continuous flow conditions only, a second category are methods/devices that covers water continuous conditions only and a third category are methods that covers both oil and water continuous flow conditions. Oil continuous conditions means that the water is dispersed in the oil as droplets such that oil becomes the continuous medium in the liquid phase. The liquid may be dispersed as droplets in the gas or the gas may be dispersed as bubbles in the liquid phase; however, the liquid in the above example is still oil continuous. Similarly, the liquid is water continuous when the oil is dispersed as droplets in the water phase. A water/oil mixture is also commonly referred to as an emulsion and similarly the emulsion may be either oil or water continuous. For each category there may also be several sub categories such as tomographic/non-tomographic methods and devices, and intrusive/non-intrusive methods and devices etc.

The water cut, or water liquid ratio (WLR), is defined as the amount of water (percentage) in the liquid emulsion (e.g. oil+water) of a multiphase mixture (e.g. oil+water+gas). For WLRs below 20%, the liquid emulsion is in general oil continuous and similarly for WLRs above 80%, the liquid emulsion is normally water continuous. In a certain WLR region the liquid emulsion can be either water continuous or oil continuous. This region is commonly referred to as the switching region since the liquid may change from oil continuous to water continuous or vice versa. Light crude oil typical has a switching region for WLRs in the range from 35% to 70% whereas heavy oil or viscous oils typical have a switching region from in the WLR range from 20% to 80%.

Figure 9:
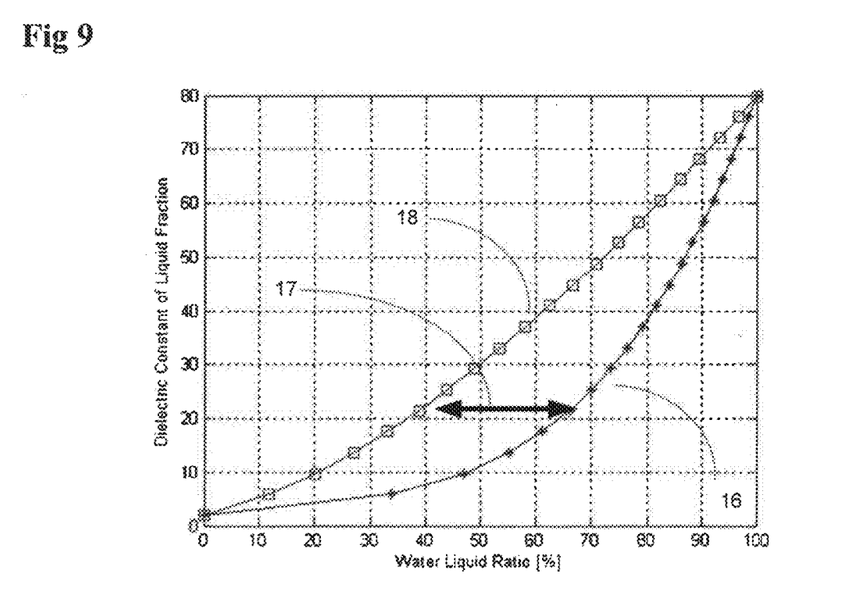
FIG. 9 shows a graph of the dielectric constant (permittivity) for a oil continuous and water continuous liquid emulsion.

The liquid phase has quite different characteristics depending whatever the liquid emulsion type is oil or water continuous. If the water is saline, an oil continuous emulsion is non-conducting whereas a water continuous emulsion is conductive. If the water is fresh there is no significant difference in the conductivity of the emulsion; however, the dielectric constant of the emulsion is quite different in the two cases irrespective of the salinity of the water as shown in FIG. 9. The dielectric constant of an oil continuous emulsion 18 is plotted in FIG. 9 for a water liquid ratio of 0-100% on the same graph as the dielectric constant of a water continuous emulsion 16 using the Bruggeman mixing law as described in "*Electromagnetic mixing formulas and applications—IEE Electromagnetic Wave Series 47*" by Ari Shivola for calculating the dielectric constant of the emulsion. In this example, the oil has a dielectric constant of 2.0 and water has a dielectric constant of 80 (fresh water). As seen from the graph, the relative difference is particularly large in the switching region indicated with an arrow 13.

Figure 8:
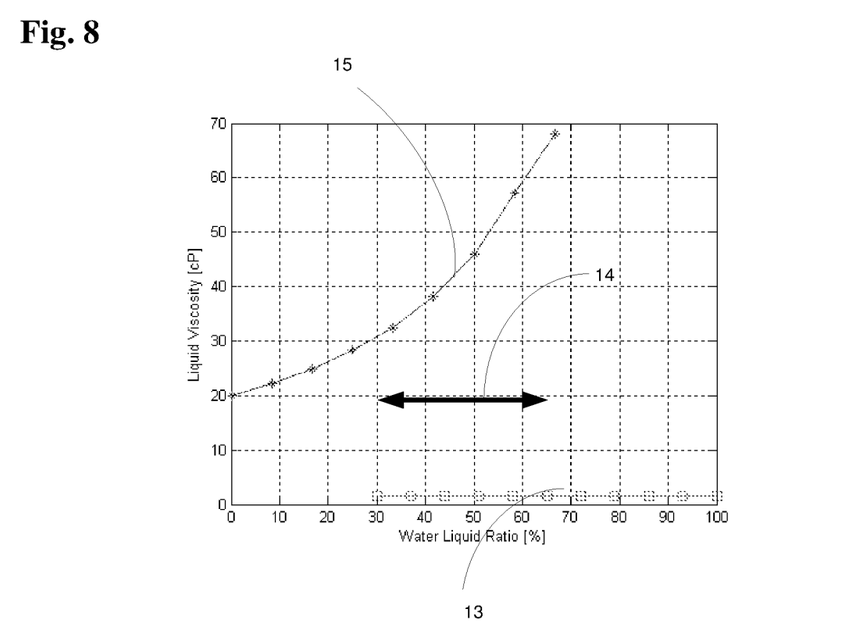
FIG. 8 shows a graph of the liquid viscosity of a oil continuous and water continuous liquid emulsion.
Figure 11:
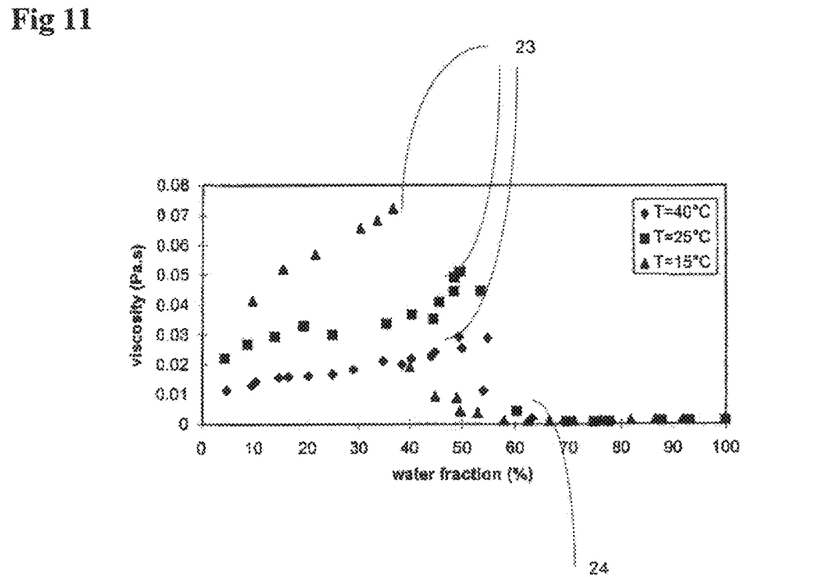
FIG. 11 shows a graph of the liquid viscosity as a function of the water fraction (WLR) for oil continuous and water continuous liquid emulsion and variation in the temperature.

The viscosity of the liquid emulsion also has a similar behavior as shown in FIG. 8. The viscosity of an oil continuous emulsion 15 is plotted as a function of WLR on the same graph as the viscosity of a water continuous liquid emulsion 13. The viscosity of an oil/water emulsion is calculated as described in "*A study of the performance of Venturi meters in multiphase flow*", by Hall, Reader-Harris, and Millington, $2^{nd}$ North American Conference on Multiphase Technology. In this example an oil viscosity of 20 cP (typical light oil) and a water viscosity of 1.5 cP (saline water) are used. As seen from the graph, the relative difference in the liquid viscosity is particularly large in the switching region indicated with an arrow 14. Since the viscosity of the oil is also temperature dependent, the oil viscosity also needs to be corrected for the temperature effect. FIG. 2 in the publication "*Viscosity of oil and water mixtures*", by A. E Corlett et al, BHR group Multiphase workshop 1999, shows an example of the temperature effect of the oil viscosity. This figure is for simplicity included as FIG. 11. For water continuous flow conditions (24), the viscosity is typically below 0.02 Pa*s (e.g. 2 cP). The switching region between oil and water continuous appears in the water fraction range 40-60% for this particular oil. For a temperature of 40° C., the liquid emulsion viscosity is in the range 0.01-0.025 Pa*s (10-25 cP) when the water fraction changes from 0-40%. However, for a temperature of 15° C., the liquid viscosity is in the range 0.04-0.07 Pa*s (40-70 cP) when the water fraction is in the range 0-40%. Hence, a change in temperature of 25° C. changes the liquid viscosity by 180% in this case.

Hence, in order to be able to calculate the liquid viscosity of an oil/water emulsion, it is important to know the oil viscosity and the water viscosity in addition to the emulsion type (oil or water continuous). Since the oil viscosity is also a function of the temperature, it is also important to know how the oil viscosity changes as a function of temperature. In addition, it is also necessary to know how the amount of water modifies the viscosity of an oil continuous emulsion. The viscosity difference between an oil and water continuous emulsion is particularly large for heavy oil conditions, where the viscosity for an oil continuous emulsion may be in the range 3.000-10.000 cP, whereas the viscosity of a water continuous emulsion may be less than 2 cP.

In field applications where the oil viscosity is high (typically above 100 cP), the oil viscosity may change over time and is also difficult to predict as a function of temperature. For multiphase applications where the oil viscosity is significant higher than the water viscosity and a differential pressure device, such as a venturi, is used to determine the mass (and volume) flow rate of the fluid mixture, it is therefore important to know whether the emulsion type is oil or water continuous, WLR and viscosity of the oil such that the correct venturi discharge coefficient can be applied. Without such knowledge, the liquid and gas flow rate may easily contain measurement errors which are in the range of 10-300% depending on the viscosity of the oil.

One way to identify whether the emulsion is oil or water continuous is to perform laboratory experiments with particular oil and water for the field, in order to determine when the oil/water mixture changes from oil to water continuous and vice versa as a function of the measured average WLR. The problem with this method is that the WLR limit for change to oil and water continuous, and vice versa, will be highly temperature and flow rate dependent, and field experience with multiphase meters have shown that it is not practical to use such a method since the WLR range for switching between oil and water continuous will contain large variations even if the average WLR is known.

The present invention overcomes this weakness with existing multiphase flow meters which are based on a venturi or other differential pressure device (such as a V-cone or Dall Tube) for determining the mass and volume flow rate. The present invention performs a dedicated measurement in order to determine the Reynolds number of the multiphase mixture. The measured Reynolds number is then used to calculate the correct discharge coefficient for a differential pressure based flow meter such as a Venturi, V-cone, Wedge meter or Dall Tube.

The invention can be used in combination with any differential based multiphase flow meter such that the multiphase meter can obtain a correct discharge coefficient despite large variation in Reynolds number caused changes in the oil viscosity, WLR or emulsion type.

In a preferred embodiment of the invention an emulsion classification measurement can also be used in order to determine the oil viscosity. When the Reynolds number is known, together with the WLR, the oil viscosity can be calculated provided that the emulsion type is oil continuous. This is possible since the Reynolds number is highly dependent on the oil viscosity for an oil continuous liquid emulsion whereas the oil viscosity virtually has no impact on the Reynolds number when the emulsion is water continuous. Hence, for an oil continuous emulsion, the oil viscosity can be determined. Oil-fields which are producing heavy oil frequently use a light oil (called diluent) to reduce the viscosity of the oil. The diluent is mixed with the heavy oil in the reservoir to make it easier to produce the oil (a light oil with low viscosity is easier to produce compared to a heavy oil). The diluent typical has a very low viscosity (less than 10 cP) whereas the heavy oil typically has a high viscosity (>1000 cP). Hence, when the oil viscosity of the multiphase fluid can be determined by the multiphase meter, this information can then be used to determine the ratio between reservoir oil and diluent oil which is an important control parameter in order to optimize production and recovery for heavy oil fields.

Multiphase flow meter which uses a differential pressure device to determine the flow rate are well known in prior art. Examples of such devices can be found in U.S. Pat. Nos. 4,638,672, 4,974,452, 6,332,111, 6,335,959, 6,378,380, 6,755,086, 6,898,986, 6,993,979, 5,135,684, 6,935,189, 7,624,652, WO 00/45133, WO03/034051, WO 02/44664.

Common to all these devices is that they are not able to determine the Reynolds number of the multiphase mixture. As a consequence, the devices are not able to perform reliable measurement of the multiphase fluid if the oil viscosity is high, particular for applications where the emulsion type is changing from water continuous to oil continuous. Similarly, these devices are not able to perform reliable measurements for heavy oil applications where the oil viscosity may vary over a broad range due to variation in the content of the diluent oil, due natural variations in the oil viscosity in the reservoir or due to comingling of wells with different oil viscosities.

Devices for measurement of fluid viscosity and/or Reynolds number are also commonly known. Examples of such devices are found in U.S. Pat. Nos. 8,353,220 and 5,661,232, based on a coriolis type flow meter. Another commonly used device for performing viscosity measurement are devices based on a vibrating element which is inserted into the flow. Examples of such devices can be found in U.S. Pat. Nos. 8,316,722 and 7,325,461, which are based on electronic driven vibrating measurement transducers. Yet another type is based on vortex sensors such as U.S. Pat. No. 8,161,801.

Viscosity sensors based on coriolis type flow meter and mechanical vibrating elements are not suited for measurement of the liquid viscosity of multiphase fluids containing gas since the gas will have a large impact on the mechanical resonance frequency and may even prevent the mechanical device from resonating. Coriolis type flow meters and vibrating elements are also known to be fragile devices which are not well suited for the harsh environment in an unprocessed well stream of oil, water and gas. Unprocessed well stream may also contain sand which can cause damage to intrusive devices such as a vibrating mechanical element or vortex sensor.

A vibrating element could be used in connection with a multiphase meter if it is installed in such a way that the gas content around the vibrating element is close to zero. By installing the vibrating element in a horizontal or vertical blind Tee of the pipe, the gas content may be low enough for performing reliable measurements. However, then the fluid in the blind Tee may not be representative for the liquid in the pipe and hence the viscosity measurement will contain a large uncertainty if there is variation in the liquid phase (e.g. variation in the WLR or oil type).

It is the purpose of this invention to overcome the above mentioned limitations of existing solutions.

It is the purpose of this invention to perform accurate measurements of the Reynolds number of a multiphase mixture containing gas.

It is the purpose of this invention to determine the discharge coefficient of differential based flow device as a function of the measured Reynolds number of the multiphase mixture.

It is the purpose of the invention to determine of the oil viscosity of a multiphase mixture containing oil, water and gas.

It is the purpose of this invention to determine the diluent (light oil) and heavy oil component of a multiphase stream containing heavy oil, diluent, gas and water It is the purpose of the invention to provide a non-intrusive device for performing the measurements.

It is the purpose of the invention to provide a compact mechanical structure for performing the measurements.

These purposes are obtained according to the invention by a method comprising the following steps:

a. the flow rates of the individual components of the multi-component mixture are measured,
b. the Reynolds number of the multi-component mixture is measured, and
c. based on the result from step a and b, a more accurate flow-rate of the individual components of the multi-component mixture is calculated.

The apparatus according to the invention is further characterized in that said emulsion type may be determined based on an electrical measurement.

Dependent claims further define preferred embodiments of the invention.

The present invention is based on measurement of the Reynolds number based on measurement of the pressure drop across the longitudinal part of a pipe section with known wall roughness, typically larger than the roughness of the surrounding pipe work including the multiphase meter. The wall roughness should be large enough such that the flow is turbulent even for low Reynolds numbers. A wall roughness greater than 0.05 is sufficient for most applications. The wall roughness is here defined as the roughness of pipe wall relative to the pipe diameter. By measuring the pressure drop across the pipe section with the large wall roughness, the Reynolds number of the fluid flowing in the pipe section can be determined provided that the velocity and density of the multiphase fluid is known.

The velocity and density of the multiphase fluid is determined by a multiphase flow meter. A multiphase flow meter based on a differential pressure flow device is particularly suited for this invention since the Reynolds number is needed for these devices in order to determine discharge coefficient of the flow meter. Example of dP based multiphase flow meters are Venturi, Dall Tube, V-Cone, Wegde and Orifice. A multiphase meter is also suited to measure the fractions of the multiphase mixture. The multiphase meter may be based on a tomographic measurement principle where the liquid distribution in the pipe cross section also can be determined or it may be based on non-tomographic measurement principle assuming that the multiphase mixture is evenly distributed in the cross section of the pipe. Example of a tomographic measurement principle which can be used to determine the velocity and density is disclosed in U.S. Pat. No. 7,624,652.

The most common multiphase meters assume a homogeneous mixture of oil, water and gas in the cross section of the pipe. In order to determine the individual fractions of a multi-component mixture of three components such as gas, water and crude oil, it is then sufficient to perform measurement of two independent physical properties related to the components of the mixture since the sum of the fractions is occupying 100% of the pipe cross section, and can be used as the third equation.

Examples of combinations suited for measurement of fractions of a multiphase mixture are permittivity measurement in combination with density measurement, conductivity measurement in combination with density measurement or two mass absorption measurements at two different energy levels. The permittivity measurement may be based on any known principle. The most common one are either based on microwave sensor principles or capacitance sensor principles. In order to calculate the fractions of the components, the corresponding physical properties for each of the components needs to be known. E.g., when permittivity and density measurement are used to measure the permittivity and density of a multiphase mixture containing gas, water and oil, the permittivity and density of the gas, water and oil needs to be known in order to calculate the volume fractions of gas, water and oil in the pipe. These measurement principles for multiphase measurement are well known and described in many of the references already cited in this document. The principles are also well known to the industry and described in *Handbook of Multiphase Flow Metering* (2005) issued by the Norwegian Society for Oil and Gas Measurement.

Based on the measured Reynolds number with the present invention, a more correct discharge coefficient can be calculated by the multiphase meter. Based on this new value of discharge coefficient, a more correct velocity of the multiphase fluid can be determined which again can be used to calculate a more correct Reynolds number by the present invention. By continuing this iterative interaction between the calculations of the present invention and the multiphase meter until the measured Reynolds number has converged to a stable value (does not change anymore), the Reynolds number and flow rate of the multiphase mixture has then been determined. The calculation can also be performed without iteration, but then the accuracy could be reduced.

By performing a second measurement which is suited to classify the liquid emulsion type as either oil or water continuous, it is also possible to determine the viscosity of the oil fraction. The WLR (water liquid ratio) of the liquid fraction is measured by the multiphase meter. When the WLR of the liquid fraction is known and the emulsion is oil continuous, the oil viscosity can easily be calculated using the equation relating the liquid viscosity to the oil viscosity, water viscosity and WLR, as described in "*A study of the performance of Venturi meters in multiphase flow*", by Hall, Reader-Harris, and Millington, $2^{nd}$ North American Conference on Multiphase Technology. The effect of gas on the multiphase mixture can easily be accounted for by using the well-known Nissan-Grundberg equation, which relates the viscosity of a liquid/gas mixture to the mass fraction of the liquid and gas and the viscosity of the individual liquid and gas fractions. When the viscosity of the oil fraction is known, it can be used to calculate the amount of diluent injected into a heavy oil well stream, provided that the viscosity of the heavy oil and diluent is known.

The uniqueness of the present invention is the ability to provide a measurement of the Reynolds number of a multiphase mixture, which then can be used to correct the flow rate measurements of a multiphase flow meter in such a way that the multiphase flow meter is able to handle a large variation in liquid viscosity range which are common for heavy oil flow conditions. The Reynolds number measurement is performed under stable flow conditions (i.e. measurement is performed at the same density and velocity as in the multiphase meter) and does not rely on any mechanical vibrating devices. It is known that the recovery pressure of a venturi is related to the viscosity and density of the fluid in the pipe and therefore also the Reynolds number of the flow (e.g. U.S. Pat. No. 7,469,188). However, field experiments where the recovery pressure of a venturi together with measured multiphase mixture density has been used to determine the viscosity and Reynolds number, has proven to be not successful. The main reason for this is that there are too many parameters which are related to the recovery differential pressure, such that it is difficult to find an unambiguous solution for the multiphase fluid viscosity and Reynolds number. As an example, both the velocity and density of the fluid changes in the recovery section of the venturi, and the change in density and velocity may continue far beyond the outlet of the venturi. This effect cannot be estimated or modeled easily and makes it difficult to provide reliable calculations of the Reynolds number. The present invention overcomes this problem since the fluid density and fluid velocity is not changing between the Reynolds sensor and the multiphase meter, since they have the same diameter and no obstructive element between them. A well defined solution for the Reynolds number is ensured by that the relationships between Reynolds number, differential pressure, and flow rate (velocity and density) are highly different. In the Reynolds sensor, friction alone generates the differential pressure, while in the venturi it is a combination of impulse and friction.

Another uniqueness of the present invention is the ability to determine the amount diluents mixed into a heavy oil well stream.

Yet another uniqueness of the present invention is that it works in an unprocessed well stream containing gas, water and other corrosive chemicals in addition to sand.

The invention will be further described in the following with reference to the figures, where.

Figure 1:
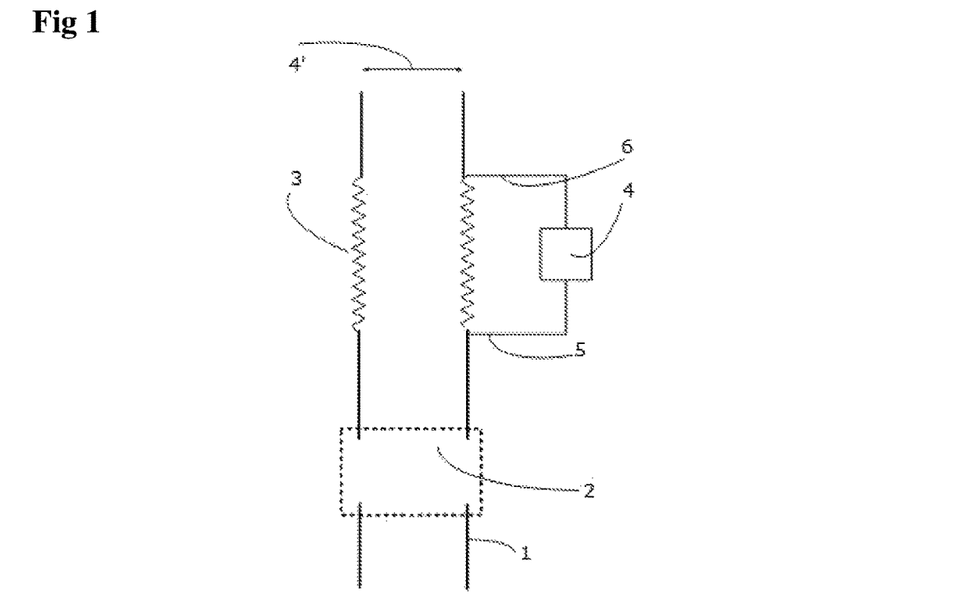
FIG. 1 shows a schematic longitudinal sectional view of a first exemplified embodiment of an apparatus for measuring the Reynolds number and correcting the flow rates of a differential pressure based multiphase meter according to the invention.
Figure 2:
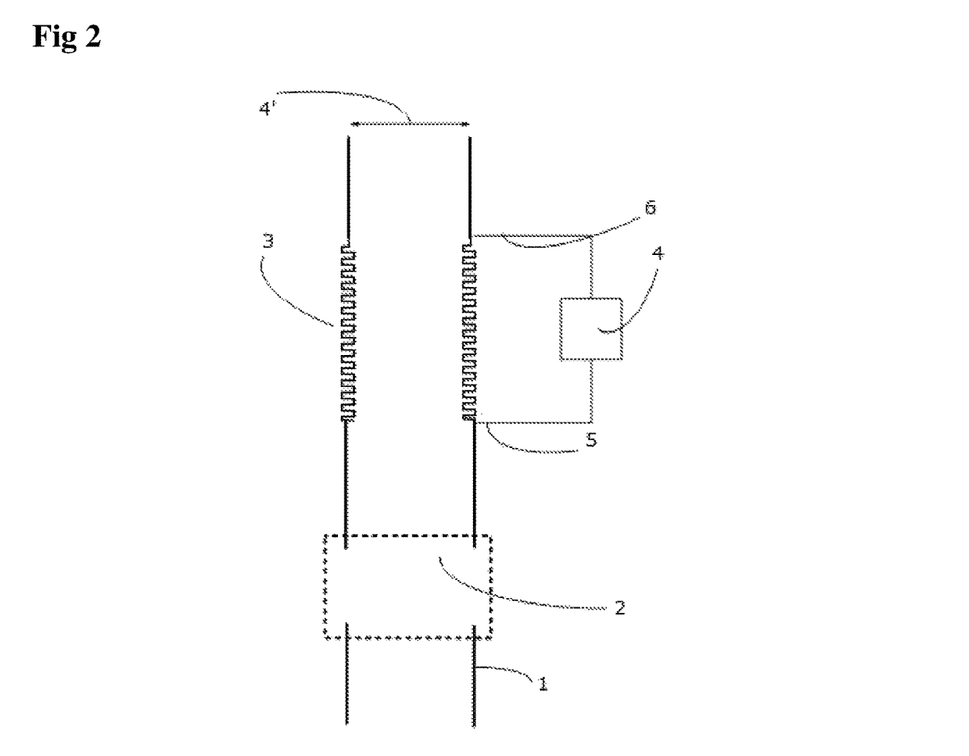
FIG. 2 shows a schematic longitudinal sectional view of a second exemplified embodiment of an apparatus for measuring the Reynolds number and correcting the flow rates of a differential pressure based multiphase meter according to the invention.

The present invention contains a tubular section 1 which contains a section with a high wall roughness 3. For simplicity, this section is in the further description of the present invention referred to as the "Reynolds sensor". The wall of the Reynolds sensor may have "saw-teeth" pattern as shown in FIG. 1, but any other mechanical design providing a rough surface, such as large threads or rectangular rings 3 as shown in FIG. 2, may be used. The present invention also includes a multiphase meter 2. The multiphase meter may be of any type, such as those described in the previous sections, which contains a differential pressure based flow meter. The multiphase flow meter described in U.S. Pat. No. 7,624,652 is particularly suited for this purpose, and for simplicity, this flow meter is used to exemplify the invention in the description below.

The device, or multiphase meter, also contains a temperature and pressure measurement for compensation purposes, but for simplicity these devices are omitted in the following discussions.

The pipe diameter of the Reynolds sensor shall have approximately the same pipe diameter as the multiphase meter as indicated by the arrow 4'. Then, the velocity of the multiphase fluid in the Reynolds sensor will be the same as the velocity in the multiphase meter as long as the Reynolds sensor is placed immediately upstream or downstream the multiphase meter.

Tappings (5/6) for measurement of the differential pressure are located at both ends of the Reynolds sensor. A conventional differential pressure transmitter 4 can be used to measure the pressure drop across the Reynolds sensor.

Changes in an inviscid flow moving from Point A to Point B along a pipe are described by Bernoulli's equation, $$h = z(x) + \frac{p(x)}{\rho g} + \frac{V(x)^2}{2g} \qquad \text{Equation 2}$$

where p is the pressure, V is the average fluid velocity, ρ is the fluid density, z is the vertical distance between the dP tappings (5/6), and g is the gravity acceleration constant.

Bernoulli's equation states that the total head h along a streamline of the pipe (parameterized by x) remains constant. This means that velocity head can be converted into gravity head and/or pressure head (or vice-versa), such that the total head h stays constant. No energy is lost in such a flow.

For real viscous fluids, mechanical energy is converted into heat (in the viscous boundary layer along the pipe walls) and is lost from the flow. Therefore one cannot use Bernoulli's principle of conserved head (or energy) to calculate flow parameters. Still, one can keep track of this lost head by introducing another term (called viscous head) into Bernoulli's equation to get, $$h = z + \frac{p}{\rho g} + \frac{V^2}{2g} + \int_{x_0}^{x} \frac{f}{D} \frac{V(\tilde{x})^2}{2g} d\tilde{x} \qquad \text{Equation 3}$$

where D is the pipe diameter. As the flow moves down the pipe, viscous head slowly accumulates taking available head away from the pressure, gravity, and velocity heads. Still, the total head h (or energy) remains constant.

Since the pipe diameter of the Reynolds sensor is the same as the pipe diameter of the multiphase meter, we then know that the fluid velocity V is the same in the two cases (stays constant). With D and V constant we can integrate the viscous head equation and solve for the pressure at Point B (6), $$p_B = p_A - \rho g \left( \Delta z + f \frac{L}{D} \frac{V^2}{2g} \right) \qquad \text{Equation 4}$$

where L is the length of the Reynolds sensor, point A is the location of the first dP tapping (5) and point B is the location of the second dP tapping (6) and $\Delta z$ is the change in pipe elevation between 5 and 6.

The viscous head term is scaled by the pipe friction factor f. In general, f depends on the Reynolds Number R of the pipe flow, and the relative roughness e/D of the pipe wall, $$f = f\left(R, \frac{e}{D}\right) \qquad \text{Equation 5}$$

The roughness measure e is the average size of the bumps on the pipe wall. The relative roughness e/D is therefore the size of the bumps compared to the diameter of the pipe. For commercial pipes this is usually a very small number. A perfectly smooth pipe would have a roughness of zero.

For laminar flow without any gas (R<2000 in pipes), f can be deduced analytically, and the result is shown in equation 6 below:

$$f = \frac{64}{R} \qquad \text{Equation 6}$$

However, when the wall roughness is large (e.g. greater than 0.05), the roughness of the wall will introduce turbulence in the flow and the flow will therefore be turbulent for Reynolds numbers well below 2000. When gas is presented in the multiphase flow, the flow will also behave turbulent for very low Reynolds numbers, provided that the wall roughness is large enough.

In other words, the relative roughness e/D of the Reynolds sensor should be designed such that turbulent flow is obtained for the multiphase fluid conditions the sensor is intended to be used for.

For turbulent flow, f can easily be determined from experimental curve fits. One such fit is provided by Colebrook (1938)—*"Turbulent Flow in Pipes", Journal of the Inst. Civil Eng.* (11), page 133" and shown in equation 7 below.

$$\frac{1}{\sqrt{f}} = -2 \cdot \log\left(\frac{e/D}{3.7} + \frac{2.51}{R\sqrt{f}}\right) \qquad \text{Equation 7}$$

By measuring the pressure at point A(5) and point B(6), obtaining the velocity of the multiphase mixture V and multiphase mixture density p from the multiphase flow meter 2, the Reynolds number of the multiphase mixture can easily be calculated in a iterative fashion based on equation 7 and equation 4.

As an alternative, an experimental derived curve or equation relating the Reynolds number to the friction factor can be obtained by performing flow loop experiments with the Reynolds sensors for flow conditions with known Reynolds numbers.

The Reynolds number of the multiphase fluid can then easily be determined by measuring the pressure at point A (5) and Point B (6) and using equation 4 to calculate the friction factor. When the friction factor is known, the experimentally derived relation between the friction factor and Reynolds number can be used to calculate the Reynolds number of the multiphase mixture. In the further description of the present invention, this Reynolds number is referred to as the "measured Reynolds number".

Based on the measured Reynolds number, an improved discharge coefficient for the venturi (or any other differential pressure based flow meter) can be calculated. FIG. 10 shows a plot of the venturi discharge coefficient 22 vs. Reynolds number 21 for a typical venturi. The data points 20 have been obtained experimentally in a flow loop. By making a curve fit to the experimental derived data points 20, an equation relating the Venturi discharge coefficient to the measured Reynolds number can be derived. This equation is then used to calculate an improved discharge coefficient based on the measured Reynolds number. Based on the improved discharge coefficient, an improved velocity of the multiphase mixture can be calculated, which again is used to calculate an improved friction factor and improved measured Reynolds number, which again is used to calculated an improved discharge coefficient of the venturi. This calculation process is repeated until the measured Reynolds number has converged to a stable value.

The method for measuring the Reynolds number and correcting the flow rate of the multiphase meter for variations in the Reynolds number can be summarized in the following steps:

1) Use the venturi discharge coefficient from previous calculation as starting value and calculate the velocity of the multiphase mixture.
2) Calculate the measured friction factor of the Reynolds sensor based on the velocity from step 1 together with measured multiphase mixture density from the multiphase meter, measured pressure drop across the Reynolds sensor and equation 4.
3) Use the experimentally derived relationship (curve) between friction factor and Reynolds number of the Reynolds sensor to calculate the measured Reynolds number
4) Use an experimentally derived relationship (curve) between Reynolds number and venturi discharge curve to calculate a new and improved value of the venturi discharge coefficient
5) Repeat step 1-5 until the measured Reynolds number (and therefore also the discharge coefficient) has converged to a stable value Step 2 and 3 above can also be replaced by an iterative calculation based on equation 4 and 7, however in practice an experimental derived relationship between the friction factor and Reynolds number as described in step 2 and 3 will give the most accurate result.

FIG. 2 shows another preferred embodiment of the present invention where the roughness of the Reynolds sensor is made of rectangular rings or grooves 3 in the wall surface. The inner diameter 4' of the rectangular rings 3 is the same as the pipe diameter such that the velocity in the Reynolds sensor is the same as the velocity in the pipe.

Figure 4:
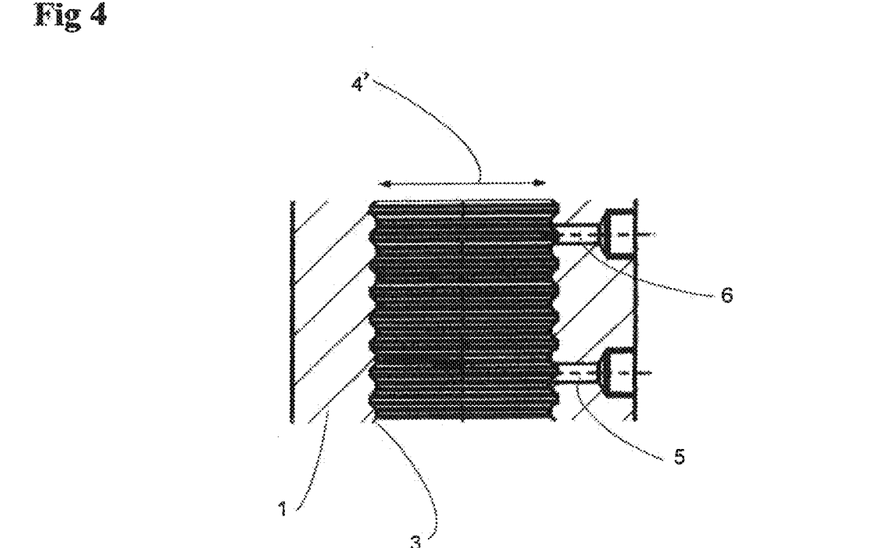
FIG. 4 shows a schematic longitudinal sectional view of an exemplified embodiment of an apparatus for measuring the Reynolds number according to the invention.

A more practical realization of the wall roughness is shown in FIG. 4 where the roughness is made based on a combination of a saw-tooth pattern and rectangular rings 3. This pattern is cost efficient to fabricate in a CNC operated machining bench.

Another way of increasing the pressure drop across the Reynolds sensor is to let its cross-sectional shape vary between its ends, e.g. from circular through rhombic and back to circular, while maintaining a constant cross-sectional area at all points.

Figure 3:
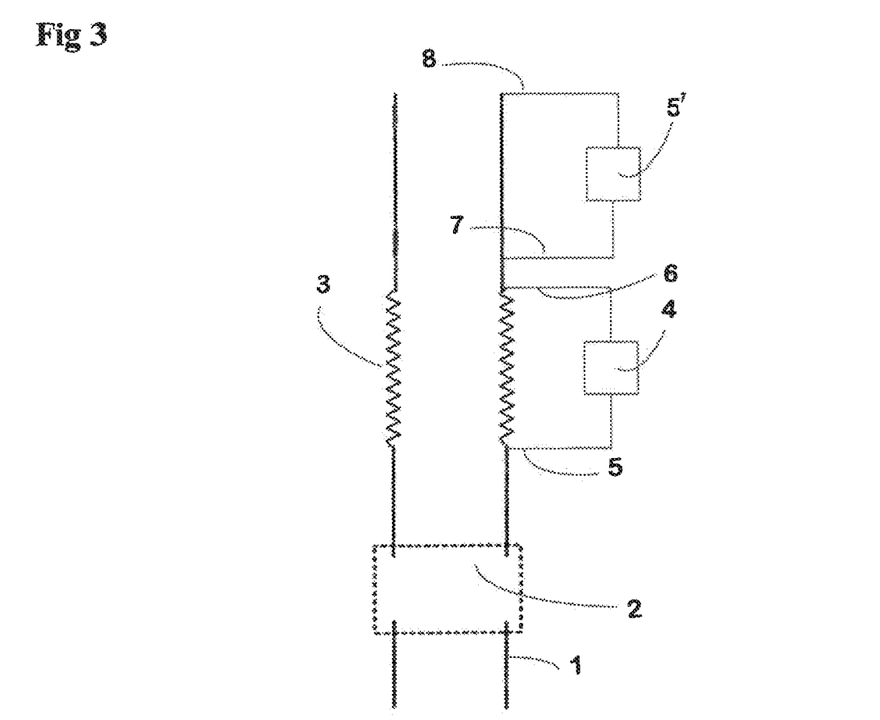
FIG. 3 shows a schematic longitudinal sectional view of a third exemplified embodiment of an apparatus for measuring the Reynolds number and correcting the flow rates of a differential pressure based multiphase meter according to the invention.

FIG. 3 shows another preferred embodiment of the present invention where a second differential pressure transmitter 5' is used to measure the pressure drop across a pipe section (7/8) of the same length as the Reynolds sensor (5/6). The wall roughness of this pipe section shall be low, and preferable the same value as the multiphase meter. Since the wall roughness of this section is low, the friction will also be low. By comparing the measured pressure drop across the Reynolds sensor 4 with the pressure drop across a normal pipe section of the same length as the Reynolds sensor, it is possible to obtain a differential measurement of the friction factor. In other words, based on this arrangement it is possible to obtain a friction measurement which is relative to the friction of the normal pipe (i.e. pipe of the multiphase meter). The algorithms for calculating the measured Reynolds number and correcting the venturi discharge coefficient will be the same as described previously, where the only modification is that the experimental curve relating the friction factor to the measured pressure drop of the Reynolds sensor will be replaced with an experimental curve relating the friction factor to the relative difference between the measurement at 4 and 5'. Examples of suitable mathematical expressions for the relative difference between 4 and 5' are the ratio between 4 and 5' or the difference between 4 and 5'.

Figure 5:
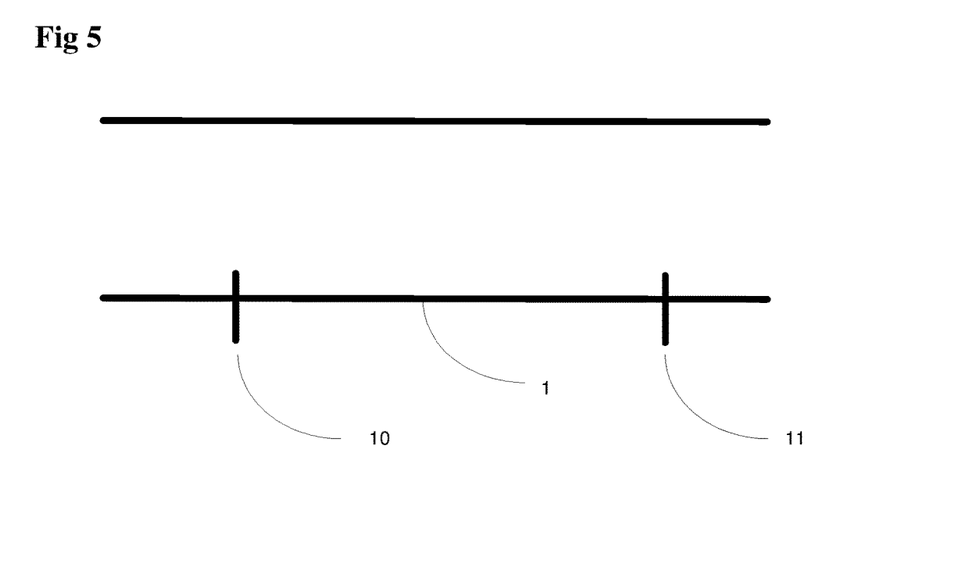
FIG. 5 shows a schematic longitudinal sectional view of a first exemplified embodiment of an apparatus for classifying the liquid emulsion type according to the invention.
Figure 6:
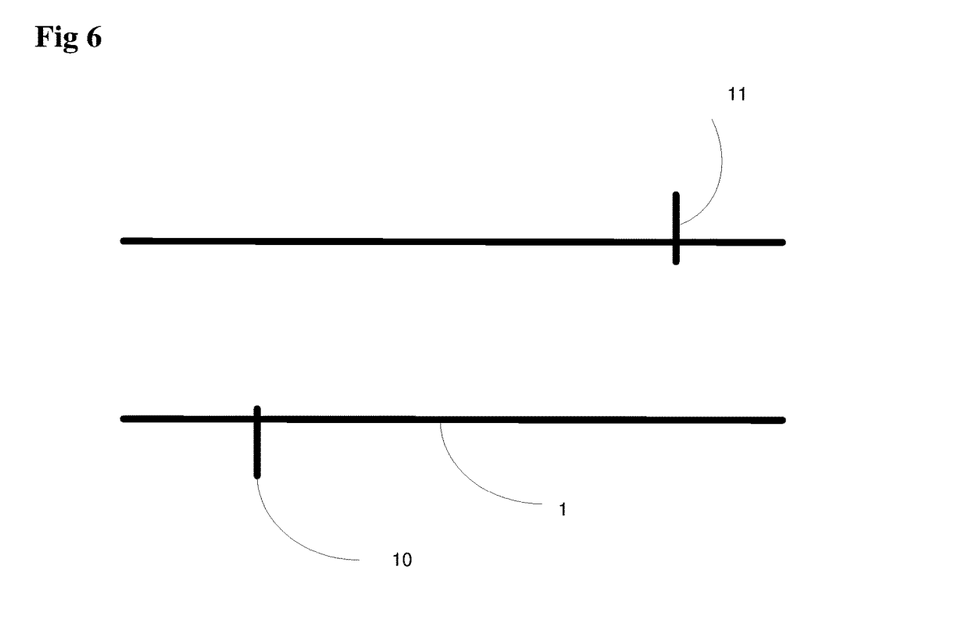
FIG. 6 shows a schematic longitudinal sectional view of a second exemplified embodiment of an apparatus for classifying the liquid emulsion type according to the invention.
Figure 7:
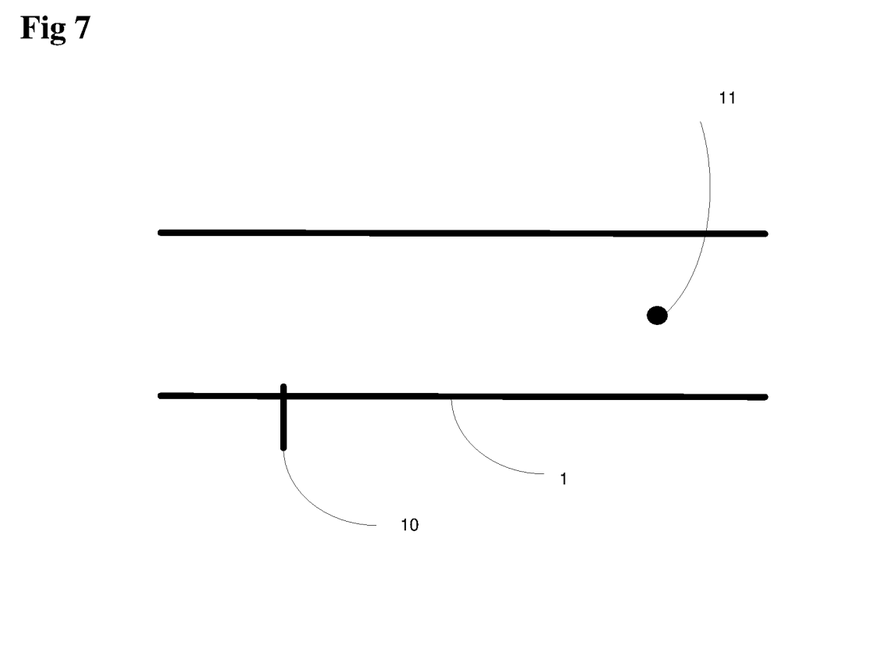
FIG. 7 shows a schematic longitudinal sectional view of a third exemplified embodiment of an apparatus for classifying the liquid emulsion type according to the invention.

The present invention can also be extended with an emulsion classification measurement to determine the viscosity of the oil fraction. An emulsion classification measurement is a measurement which is suited to determine whether the liquid phase is oil or water continuous. Examples of devices suited to perform emulsion classification measurement are shown in FIGS. 5, 6 and 7. A transmitting antenna 10 and receiving antenna 11 are located in a pipe 1. The distance between the antennas 10 and 11 may be from 1 to a few pipe diameters. The antennas may be of any type suited for transmitting electromagnetic energy into the pipe. A coaxial antenna is common way to achieve this. Since design of antennas are well known in prior art, it is not described any further.

Figure 12:
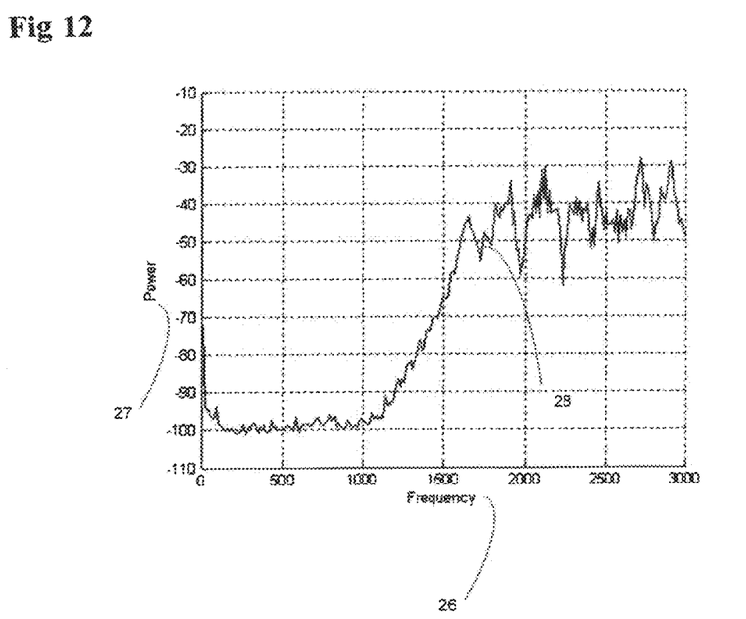
FIG. 12 shows a graph of the measured loss versus frequency at oil continuous liquid emulsion of the apparatus of FIG. 5.
Figure 13:
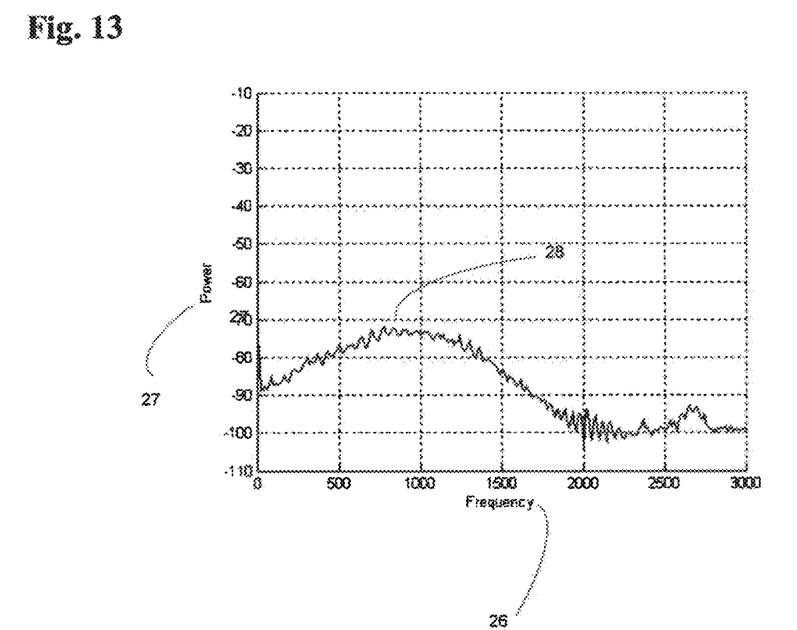
FIG. 13 shows a graph of the measured loss versus frequency at water continuous liquid emulsion of the apparatus of FIG. 5.

By transmitting a broadband signal on antenna 10 and measuring the received power at antenna 11, the frequency response will be quite different when the liquid phase is oil continuous vs. water continuous. FIG. 12 shows the received power 27/28 as a function of frequency 26 when the liquid phase is oil continuous and FIG. 13 shows the received power 27/28 as a function of frequency 26 when the liquid phase is water continuous.

For oil continuous liquid, the received power 27/28 is large at the highest frequency and low at the lowest frequencies. For water continuous liquid emulsion, the power at the highest frequencies is comparable to the power at the lowest frequencies. By calculating the average power in a low frequency band and average power in a high frequency band and calculating the ratio between the average power in these two band, a relative ratio of the high frequency power vs. the low frequency power can be obtained. This ratio is in this document referred to as the "Broadband loss ratio".

Figure 14:
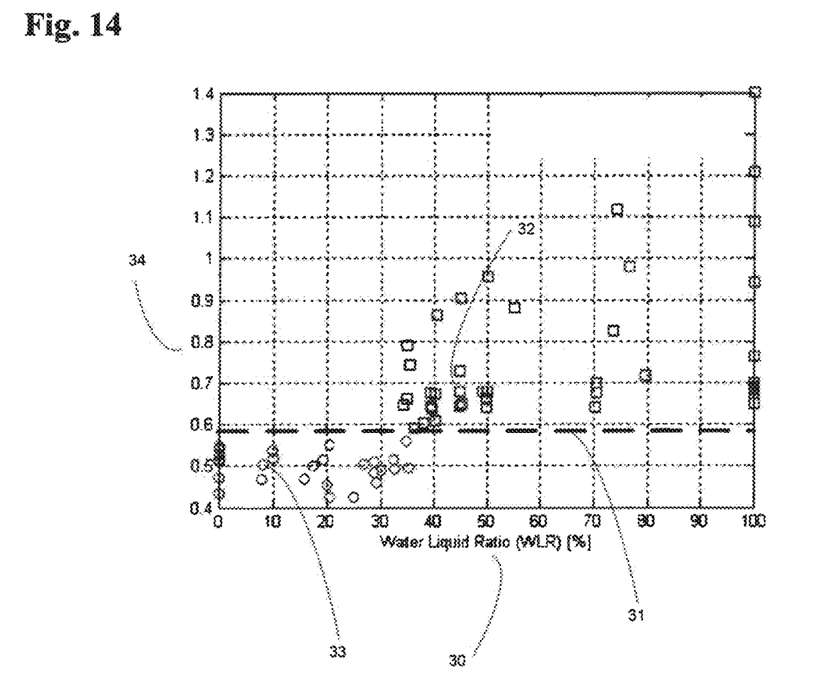
FIG. 14 shows a graph of an emulsion classification feature, derived from the measured loss versus frequency of a water and oil continuous liquid emulsions of the apparatus of FIG. 5, against WLR for different multiphase flow regimes, Below is a summary of the main elements involved in determining the Reynolds number of the multiphase mixture and how it is used to correct the flow rates of a multiphase flow meter. The main elements involved in classifying the liquid emulsion are also described.

FIG. 14 shows the measured Broadband loss ratio for oil continuous emulsions 33 and water continuous emulsions 32 for WLR range of 0-100%. The data has been obtained based on measurements in the MPM Multiphase test flow loop for a gas fraction (GVF) in the range 0-99.9% and water salinity in the range 0-1% NaCl. Since all these test points has been collected with relative low water salinity where the difference between oil continuous and water continuous is less compared to higher salinities, it is considered as being a worst-case scenario for a practical multiphase meter. By comparing the measured Broadband loss ratio vs an empirical derived threshold value 31, the emulsion is classified as oil continuous if the Broadband loss ratio is below the threshold value and water continuous if the measured Broadband loss ratio is above the threshold value.

FIG. 6 and FIG. 7 shows other preferred arrangements for the transmitting and receiving antennas, but in principle the antennas may be located in any plane around the pipe circumference as long as the distance between the antennas are in the range of one to a few pipe diameters.

The measurement for performing the emulsion classification measurement may be obtained from a separate device/sensor. For simplicity this is not shown in any figures; however, this is considered to be obvious to a person skilled in the art. Alternatively, it may be possible to realize the emulsion classification measurement as a part of the multiphase meter 2. The multiphase meter disclosed in U.S. Pat. No. 7,624,652 is an example of a device well suited for this purpose since it contains at least two antennas in the pipe in a similar manner as FIG. 5-7.

The method for determining the viscosity of the oil can then be summarized in the following steps:

1) Use the venturi discharge coefficient from previous calculation as starting value and calculate the velocity of the multiphase mixture.
2) Calculate the measured friction factor of the Reynolds sensor based on the velocity from step 1 together with measured multiphase mixture density from the multiphase meter, measured pressure drop across the Reynolds sensor and equation 4.
3) Use the experimentally derived relationship (curve) between friction factor and Reynolds number of the Reynolds sensor to calculate the measured Reynolds number
4) Use an experimentally derived relationship (curve) between Reynolds number and venturi discharge curve to calculate a new and improved value of the venturi discharge coefficient
5) Repeat step 1-4 until the measured Reynolds number (and therefore also the discharge coefficient) has converged to a stable value
6) Calculated the multiphase viscosity based on the measured Reynolds number, pipe diameter, measured multiphase mixture density using equation 0.
7) Calculate the viscosity of the liquid phase. A Nissan Grundberg type model together with the measured mass fraction of liquid and gas from the multiphase meter can be used for this purpose.
8) The emulsion type is classified by a separate classification measurement. The classification measurement may be based on measuring the Broadband loss ratio as described above and comparing it to a empirically determined threshold. If the BroadBand loss ratio is above the threshold, the emulsion is classified as water continuous, and if it is below the threshold, the liquid emulsion is classified as oil continuous.

9) The viscosity of water, and gas are calculated at present temperature and pressure. The temperature and pressure is measured using conventional transmitters mounted in the pipe. Most flow meters, such as a multiphase flow meter, also contains an integrated pressure and temperature transmitter. The viscosity is typically calculated from a pressure and temperature dependent look-up table which is generated in an off-line PVT simulator such as PVTSim or Infochem.

10) If the liquid emulsion is classified as water continuous, the previous value is used as oil viscosity (the viscosity can only be calculated for oil continuous flow conditions)

11) If the liquid emulsion is classified as oil continuous, then the oil viscosity is calculated based on the measured WLR, measured liquid viscosity from step 7 and the viscosity for water. Equation for calculating the oil viscosity based on the measured WLR and liquid viscosity can be found in "*A study of the performance of Venturi meters in multiphase flow*", by Hall, Reader-Harris, and Millington, $2^{nd}$ North American Conference on Multiphase Technology.

It will be clear to the skilled person that the invention is not limited to the exemplifying embodiments described in the above, but may be varied and modified within the scope of the appended claims.

The invention claimed is:

1. A method for determining the flow rates of a multi-component mixture in a pipe containing at least a liquid phase comprising an emulsion of oil and water, the emulsion being either of the water continuous type or the oil continuous type, the method comprising the following steps:
  a. the flow rates of the individual components of the multi-component mixture are measured in a flow meter,
  b. the Reynolds number of the multi-component mixture is determined at a location separate from the flow meter but with the same flow rate of the multi-component mixture as in the flow meter,
  c. the emulsion type of the liquid phase of the multi-component mixture is determined, and
  d. based on the results from steps b and c, a more accurate flow-rate of the individual components of the multi-component mixture and a fluid property of at least one of the components of the multi-component mixture are calculated;

wherein,
  the Reynolds number is determined based on a measurement of a pressure drop across a pipe section with a large wall roughness.

2. A method according to claim 1, wherein the said flow rates of the individual components of the multi-component mixture is measured using a multiphase flow meter.

3. A method according to claim 2, wherein said multiphase flow meter contains one of a Venturi, V-cone and Dall-tube.

4. A method according to claim 3, wherein said pipe section with large wall roughness has the same inner diameter as said multiphase flow meter.

5. A method according to claim 1, wherein an axial section through said wall roughness has one of a saw-tooth pattern, square wave pattern and sinusoidal pattern.

6. A method according to claim 1, wherein said Reynolds number is determined based on a ratio and/or difference between a measurement of the pressure drop across the pipe section with the large wall roughness and a pressure drop across a pipe section with a small wall roughness.

7. A method according to claim 1, wherein said emulsion type is determined based on an electrical measurement.

8. A method according to claim 6, wherein said electrical measurement is based on one of permittivity, conductivity, resistivity, impedance, loss or phase.

9. A method according to claim 1, wherein said fluid property is the viscosity of the oil component of the multi-component mixture.

10. A method according to claim 1, wherein said more accurate flow rate of the individual components contains the flow rate of a heavy and/or a diluent oil.

11. An apparatus for determining the flow rates of a multi-component mixture in a pipe, the apparatus comprising the following elements:
  a. a flow meter for measuring the individual components of the multi-component mixture,
  b. means for determining the Reynolds number of the multi-component mixture at a location separate from the flow meter but where the flow rate of the multi-component mixture will be the same as in the flow meter,
  c. means for measuring the emulsion type of the liquid phase of the multi-component mixture, and
  d. a computer and a mathematical program for calculating the Reynolds number of said-component mixture and a mathematical program for calculating the flow rates of the individual components of said multi-component mixture;

wherein,
  said means for determining the Reynolds number contains a pipe section with a large wall roughness and a means for measuring a pressure drop across the pipe section with the large wall roughness.

12. An apparatus according to claim 11, wherein the said flow-meter is a multiphase flow meter.

13. An apparatus according to claim 12, wherein said multiphase flow meter contains one of a Venturi, V-cone and Dall-tube.

14. An apparatus according to claim 11, wherein said pipe section with large wall roughness has the same inner diameter as said multiphase flow meter.

15. An apparatus according to claim 11, wherein an axial section through said wall roughness has one of a saw-tooth pattern, square wave pattern and sinusoidal pattern.

16. An apparatus according to claim 11, wherein said means for determining the Reynolds number further contains a pipe section with a small wall roughness and a means for measuring the pressure drop across the pipe section with the small wall roughness.

17. An apparatus according to claim 11 wherein said means for measuring the emulsion type has at least one device for transmitting electromagnetic energy into the pipe and/or at least one device for receiving electromagnetic energy from the pipe.

* * * * *